(12) United States Patent
Hayakawa

(10) Patent No.: US 7,605,362 B2
(45) Date of Patent: Oct. 20, 2009

(54) ANGLED CCD IMAGE CAPTURE DEVICE

(75) Inventor: Hiroshi Hayakawa, Saitama Pref. (JP)

(73) Assignees: Optoelectronics Co., Ltd., Warabi, Saitama Pref. (JP); Opticon, Inc., Orangeburg, NY (US)

(*) Notice: Subject to any disclaimer, the term of this patent is extended or adjusted under 35 U.S.C. 154(b) by 144 days.

(21) Appl. No.: 11/358,244

(22) Filed: Feb. 21, 2006

(65) Prior Publication Data
US 2007/0194220 A1    Aug. 23, 2007

(51) Int. Cl.
*H01J 5/02* (2006.01)
(52) U.S. Cl. .................. 250/239; 250/226; 235/462.23
(58) Field of Classification Search ............ 250/208.1, 250/239; 235/462.43
See application file for complete search history.

(56) References Cited

U.S. PATENT DOCUMENTS

| 5,717,200 | A | * | 2/1998 | Hashimoto | ............... 250/208.1 |
| 5,992,749 | A | * | 11/1999 | Seo | ........................ 235/472.01 |
| 2003/0001014 | A1 | * | 1/2003 | Kumagai | ..................... 235/454 |

FOREIGN PATENT DOCUMENTS

JP    2003-329937    * 11/2003

* cited by examiner

*Primary Examiner*—Georgia Y Epps
*Assistant Examiner*—Tony Ko
(74) *Attorney, Agent, or Firm*—Kaplan Gilman & Pergament LLP

(57) ABSTRACT

A handheld imaging device includes a CCD array or similar detector which is tilted with respect to the incoming light. The tilt permits a narrower handheld device to be manufactured, as the housing need not be as wide as the CCD or similar array.

6 Claims, 3 Drawing Sheets

“ANGLED CCD IMAGE CAPTURE DEVICE

TECHNICAL FIELD

This invention relates to imaging devices for reading symbols and the like, and more specifically, to an improved imaging device preferably employing a charge coupled device (CCD) detector.

BACKGROUND OF THE INVENTION

One and two dimensional handheld imaging devices are known in the art. Such devices often employ either CCD technology or other technology for accomplishing the same function, such as CMOS technology. These devices involve a one dimensional array or two dimensional matrix of elements that capture light and output an electrical signal, the level of which depends upon the captured light. An entire image may then be captured and translated into an electrical signal for storage, analysis, and display.

Known image capture devices, particularly one dimensional image capture devices, employing CCD technology are size limited because the CCD detector is a prescribed width. In order for the CCD array to be wide enough to appropriately capture an image, the housing which the CCD array is placed is subject to a certain minimum width. Moreover, the manufacturers of image capture devices often procure the CCD arrays from third party. Thus, the width of the image capture device of a manufacturer is dictated by a third party's choice concerning the width of a CCD array.

FIG. 1 depicts the prior art handheld CCD image capture device 100. The device 100 includes a CCD array 101, behind a lens 102, all contained within a housing 103, shown in dotted outline. Various additional components for holding the lens 102, CCD array 101, and other circuitry are not shown for purposes of clarity and simplicity.

The housing 103 is intended to be of a size and shape that is convenient and comfortable for a user to hold in one hand. The entire arrangement of FIG. 1 is typically contained in a hand held image capture device.

Because the width of the CCD array 101 is determined by its manufacturer, a different manufacturer incorporating CCD array 101 into a handheld image capture device 100 faces a minimum width limitation with respect to housing 103. More specifically, the housing 103 must be wide enough at the point in which the CCD array is installed in order to accommodate the CCD array 101. This leads to a width of the handheld scanner that is wider than it is desirable.

In view of the foregoing, there exists a need in the art for a hand held scanner that includes a CCD or similar detector array, wherein the housing 103 can be narrower than the width of the CCD array 101, in order to facilitate a thinner handle and more comfortable grip.

DETAILED DESCRIPTION OF THE PREFERRED EMBODIMENT

Figure 1:
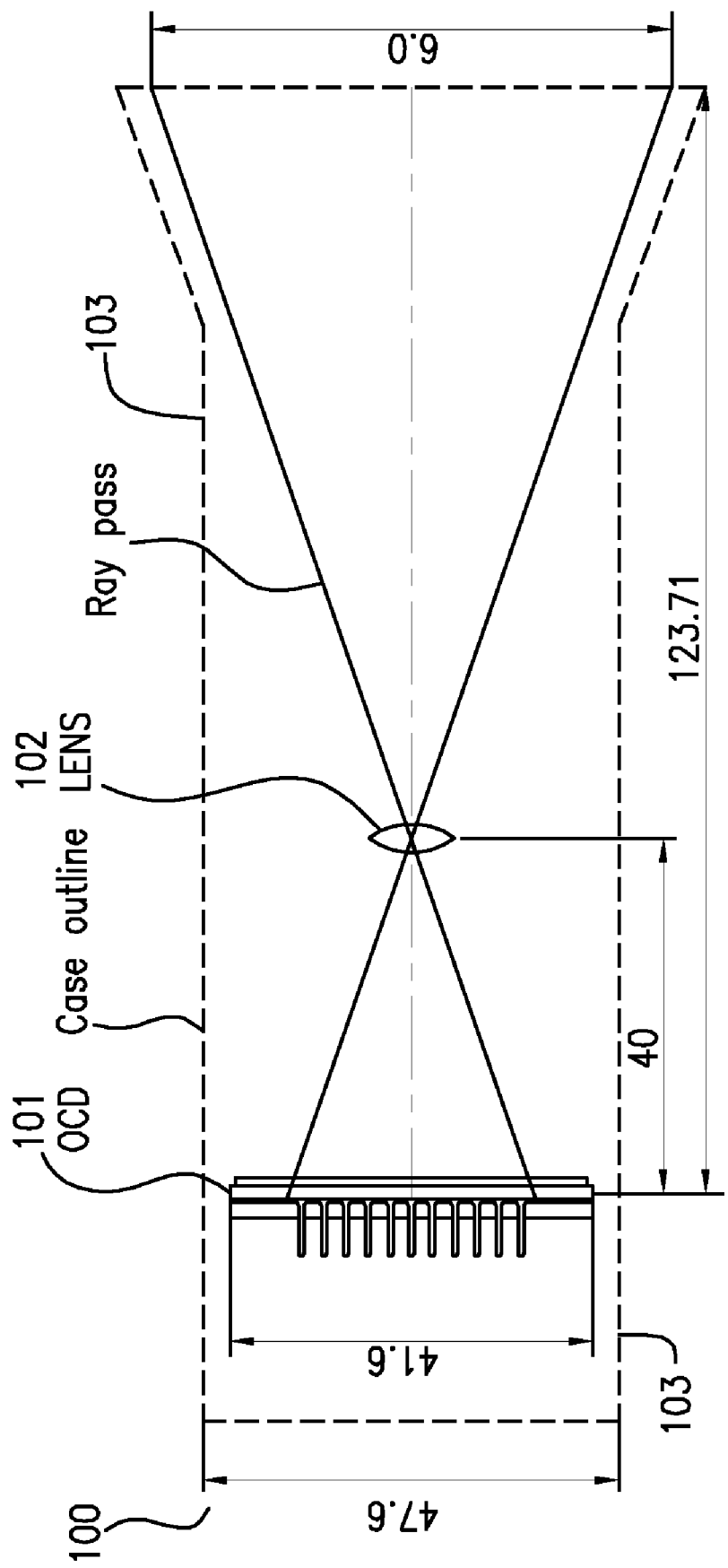
FIG. 1 depicts a prior art handheld scanner including a CCD array.
Figure 2:
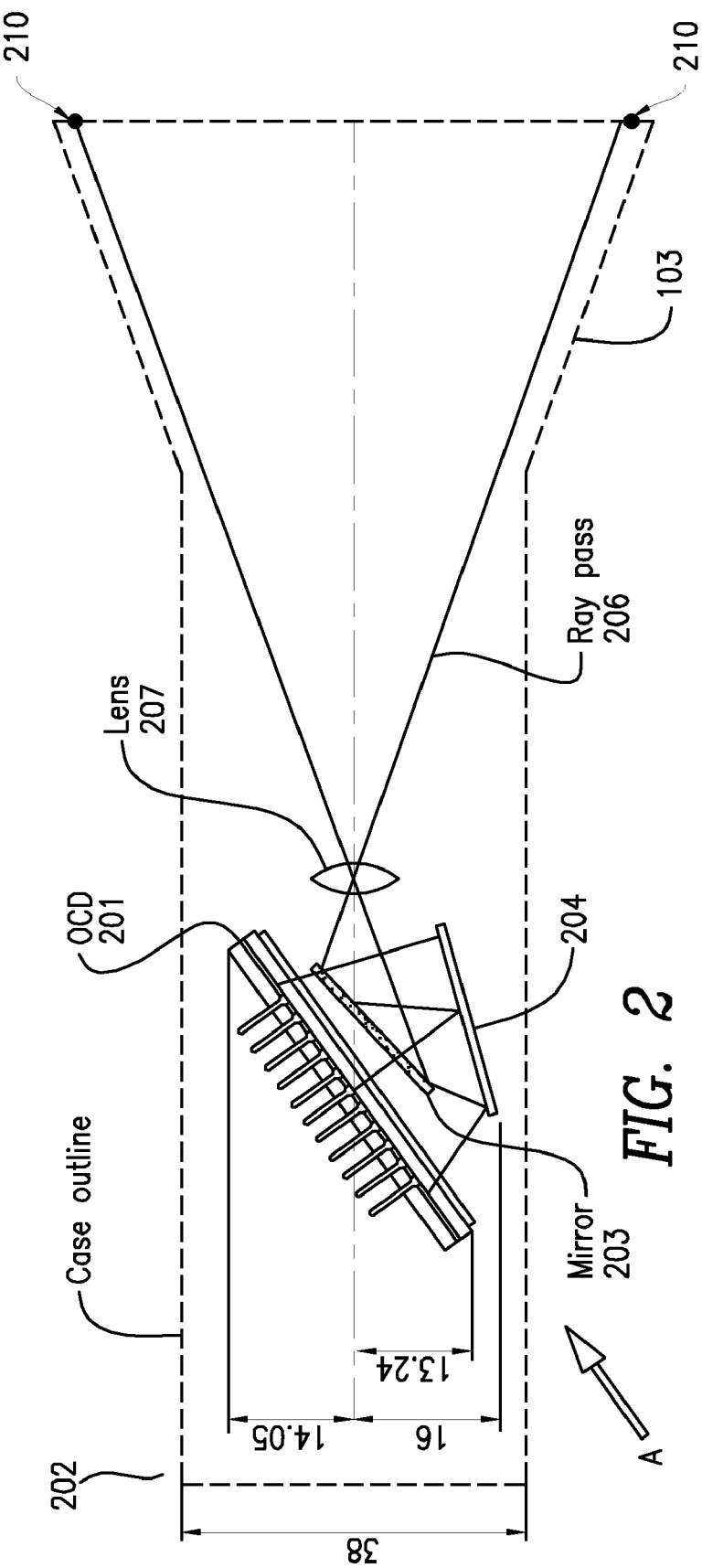
FIG. 2 depicts a handheld CCD array scanner in accordance with the teachings of the present invention.
Figure 3:
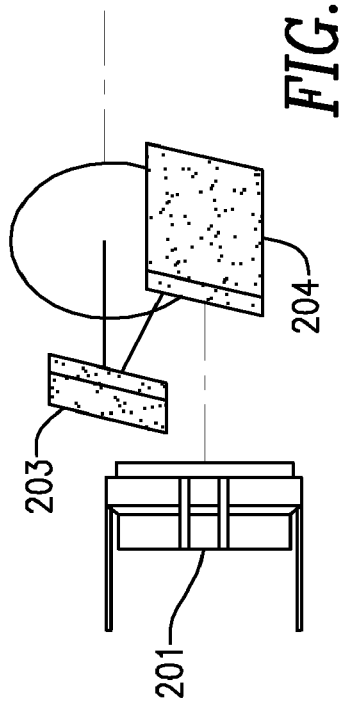
FIG. 3 depicts a side perspective view of the arrangement shown in FIG. 2.

FIG. 2 depicts an exemplary embodiment of the present invention including a CCD array 201 positioned behind a lens 207 with two intervening mirrors 203 and 204. The mirrors 203 and 204 are tilted slightly with respect to each other as best shown in FIG. 3. The positioning of the two mirrors 203 and 204 provides a path to the detector 201 as indicated in FIG. 3.

Although a CCD array 201 is shown, it is understood that the imaging device may be based upon CMOS or other technology as well. Additionally, image capture device 100 also includes a illumination circuit as is known in the art, which can comprise, for example, LED's or other suitable sources of light positioned, for example, around the front of housing 103 as shown in FIG. 2. The light emitted from these one or more illumination sources is reflected by the image to be captured in accordance with techniques well known in the art.

In operation, light enters the housing 202 and is focused by lens 207 onto a mirror 203. The light is redirected as shown in FIG. 3 to mirror 204, which projects it on to CCD detector array 201. As seen looking out from the front surface of CCD array 201 upon which the received light impinges, the light arrives perpendicularly, so the device will behave as if the CCD array 201 were facing forward as in conventional image capture devices. However, because the mirrors are used to alter the direction of the light, the CCD array 201 is not oriented directly forwardly, and thus, may be wider than the width of the housing 103. Making the housing potentially narrower provides for a more comfortable grip.

It is also possible to utilize one mirror to bend the incoming light, and to place the CCD array at any angle required to receive the incoming light reflected from the mirror. Alternatively, one or more prisms may be used to bend the incoming light rather than reflect it. For example, and referring to FIG. 2, if mirror 203 is replaced with a prism, the incoming light can be bent upwards to convey it to CCD array 201, rather than reflecting it off of a second mirror 204 as shown. Multiple prisms to bend the light may be used as well. Alternatively, one or more prisms may be used in conjunction with one or more mirrors in order to ensure that the width of the detector array is not oriented in the same direction as the width of the housing.

Figure 4:
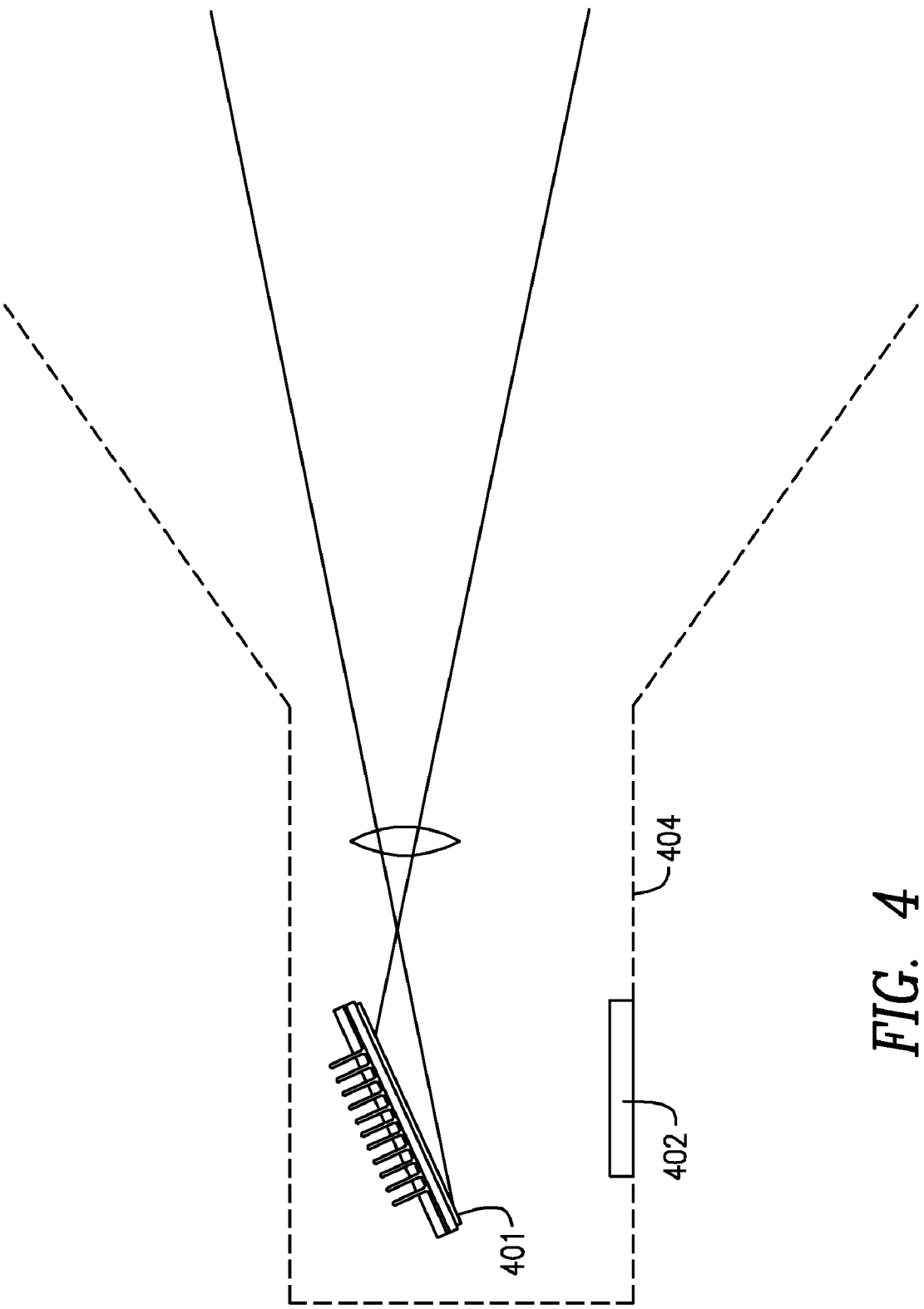
FIG. 4 is an alternative embodiment of the present invention.

FIG. 4 shows an alternative embodiment of the present invention using one mirror 401 and detector array 402 disposed along a bottom side wall of housing 404. The mirror 401 reflects the incoming light downward to detector array 402, facilitating the image capture.

The above describes the preferred embodiments of the invention, but various other modifications and additions will be apparent to those of skill in the art. Such modifications are intended to be within the scope of the following claims.

The invention claimed is:

1. An image capture device including:
a housing for fitting within a hand and having a forward opening for receiving light;
said housing including therewithin a detector array having a light receiving surface, said detector being surrounded by walls of said image capture device, said light receiving surface being wider in width than a space between said walls, said light receiving surface being tilted with respect to said surrounding walls to permit said light receiving surface to fit in said space;

a lens having a central optical axis;

a first reflecting surface for altering a path traversed by light received through said forward opening so as to reflect it onto said light receiving surface; and a second reflecting surface positioned to reflect light from said forward opening towards said first reflecting surface and said first reflecting surface positioned to reflect light from said second reflecting surface onto said light receiving surface.

2. The image capture device of claim 1 wherein said detector array is a CCD array.

3. The image capture device of claim 1 further including at least one prism substituted for one of said reflecting surfaces for assisting in conveying received light to said detector array.

4. The image capture device of claim 1 wherein one of said reflecting surfaces is replaced by a prism cooperating with said other reflecting surface to cause light received through said opening to be incident upon said light receiving surface.

5. The image capture device of claim 1 wherein one of said first and second reflecting surfaces is on a mirror.

6. The image capture device of claim 1 wherein said first and second reflecting surfaces face in opposite directions along said optical axis.

* * * * *